United States Patent
Miyata et al.

(10) Patent No.: US 10,104,261 B2
(45) Date of Patent: Oct. 16, 2018

(54) PRINTING APPARATUS AND NON-TRANSITORY COMPUTER READABLE MEDIUM

(71) Applicant: FUJI XEROX CO., LTD., Tokyo (JP)

(72) Inventors: Chiemi Miyata, Kanagawa (JP); Noriyuki Suzumura, Kanagawa (JP); Shinichi Takano, Kanagawa (JP); Daichi Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/708,808

(22) Filed: Sep. 19, 2017

(65) Prior Publication Data

US 2018/0205844 A1    Jul. 19, 2018

(30) Foreign Application Priority Data

Jan. 13, 2017    (JP) ................. 2017-004550

(51) Int. Cl.
G06F 3/12       (2006.01)
H04N 1/00       (2006.01)
H04N 1/32       (2006.01)

(52) U.S. Cl.
CPC ....... H04N 1/00954 (2013.01); G06F 3/1205 (2013.01); G06F 3/126 (2013.01); H04N 1/32021 (2013.01); H04N 1/32122 (2013.01); H04N 2201/0094 (2013.01); H04N 2201/3214 (2013.01); H04N 2201/3274 (2013.01)

(58) Field of Classification Search
None
See application file for complete search history.

(56) References Cited

U.S. PATENT DOCUMENTS

| 7,924,442 | B2 * | 4/2011 | Watabe | G03G 21/04 358/1.1 |
| 9,377,981 | B2 * | 6/2016 | Fukasawa | G06F 3/126 |
| 2007/0094598 | A1 * | 4/2007 | Nakai | H04N 1/00416 715/703 |
| 2010/0014110 | A1 * | 1/2010 | Munetomo | H04N 1/0084 358/1.14 |
| 2015/0237228 | A1 * | 8/2015 | Okuzono | G06K 15/406 358/1.13 |
| 2015/0277810 | A1 * | 10/2015 | Fukasawa | G06F 3/126 358/1.15 |
| 2016/0117178 | A1 * | 4/2016 | Amano | G06F 3/0482 715/708 |

FOREIGN PATENT DOCUMENTS

JP    2007-34534 A    2/2007

* cited by examiner

*Primary Examiner* — Dung D Tran
(74) *Attorney, Agent, or Firm* — Oliff PLC (57) ABSTRACT

A printing apparatus includes a memory, a receiving unit, and a printing unit. The memory stores print schedule information indicating regular time information concerning a time at which printing is regularly performed and also stores print settings information in association with the print schedule information. The receiving unit receives print data. The printing unit prints the print data received by the receiving unit in accordance with the print settings information if a time at which the print data is received matches the regular time information indicated in the print schedule information.

12 Claims, 5 Drawing Sheets

| TIME SLOT | MONDAY | TUESDAY | WEDNESDAY | THURSDAY | FRIDAY |
|---|---|---|---|---|---|
| 8:00–10:00 | SETTING 1 | SETTING 1 | SETTING 2 | SETTING 5 | SETTING 3 |
| 10:00–12:00 | SETTING 2 | SETTING 1 | SETTING 2 | SETTING 4 | SETTING 3 |
| 12:00–14:00 | SETTING 3 | SETTING 3 | SETTING 3 | SETTING 3 | SETTING 3 |
| 14:00–16:00 | SETTING 4 | SETTING 3 | SETTING 4 | SETTING 2 | SETTING 3 |
| 16:00–18:00 | SETTING 5 | SETTING 3 | SETTING 5 | SETTING 1 | SETTING 3 |

| SETTING IDENTIFICATION INFORMATION | SHEET TRAY | PRINT DIRECTION | SINGLE-SIDED/ DOUBLE-SIDED | ENLARGEMENT/ REDUCTION | BYPASS-TRAY SHEET SIZE |
|---|---|---|---|---|---|
| SETTING 1 | TRAY 1 | PORTRAIT | DOUBLE-SIDED | NO | — |
| SETTING 2 | TRAY 3 | PORTRAIT | SINGLE-SIDED | A3→A4 | — |
| SETTING 3 | BYPASS TRAY | PORTRAIT | SINGLE-SIDED | NO | A4 |
| SETTING 4 | TRAY 2 | LANDSCAPE | DOUBLE-SIDED | A4×2 | — |
| SETTING 5 | TRAY 1 | LANDSCAPE | SINGLE-SIDED | A4×2 | — |

FIG. 4

PRINTING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-004550 filed Jan. 13, 2017.

BACKGROUND (i) Technical Field

The present invention relates to a printing apparatus and a non-transitory computer readable medium.

(ii) Related Art

A printer system has been suggested in which print settings are automated.

SUMMARY

According to an aspect of the invention, there is provided a printing apparatus including a memory, a receiving unit, and a printing unit. The memory stores print schedule information indicating regular time information concerning a time at which printing is regularly performed and also stores print settings information in association with the print schedule information. The receiving unit receives print data. The printing unit prints the print data received by the receiving unit in accordance with the print settings information if a time at which the print data is received matches the regular time information indicated in the print schedule information.

BRIEF DESCRIPTION OF THE DRAWINGS

An exemplary embodiment of the present invention will be described in detail based on the following figures, wherein.

DETAILED DESCRIPTION

An exemplary embodiment of the invention will be described below with reference to the accompanying drawings. In the drawings, elements having substantially the same function are designated by the same reference numeral, and the same explanation thereof will not be repeated.

[Overview of Exemplary Embodiment]

A printing apparatus according to the exemplary embodiment includes a memory, a receiving unit, and a printing unit. The memory stores print schedule information indicating regular time information concerning a time at which printing is regularly performed and also stores print settings information in association with the print schedule information. The receiving unit receives print data. The printing unit prints the print data received by the receiving unit in accordance with the print settings information if a time at which the print data is received matches the regular time information indicated in the print schedule information.

Some items of print data received by the receiving unit are with print settings information, and some items of print data are without print settings information. Examples of print data without print settings information are text data, such as form data, and comma-separated values (CSV) files. A CSV file is data constituted by dynamically changing items separated by delimiters, such as commas, for example, names and addresses input into fields defined in a template. A template may be sent together with a CSV file. However, it may alternatively be stored in a memory of a printing apparatus as print settings information.

Print settings information is information concerning print settings, such as a tray to be used (the size, quality, and feeding direction of recording sheets, for example, can be specified), enlargement/reduction size, monochrome/color printing, and single-sided/double-sided printing. The print settings information may also include information indicating a template.

If print data received by the receiving unit is without print settings information, the printing unit prints the print data in accordance with print settings information associated with print schedule information. Even for print data with print settings information, the printing unit may print the print data in accordance with print settings information associated with print schedule information if a certain condition is satisfied, for example, a user has permitted to do so.

Regular time information is information concerning a time at which printing is regularly performed. The regular time information may be indicated only by a time slot. The time slot is a certain range of time between times of day. The time slot may be a time slot between any certain times of day. The time slot may be a time slot in the morning or in the afternoon or operating hours of a printing apparatus (8:00 to 18:00, for example). The time slot may be a combination of two or more time slots. An example of a combination of two or more time slots is a time slot which is in the morning or in the afternoon and also within the operating hours of the printing apparatus (8:00 to 12:00, for example, as a time slot which is in the morning and within the operating hours).

The regular time information may be indicated only by a period represented by a day or a longer time unit. Such a period may include any of a day, a day of the week, a week, a month, and a year.

The regular time information may be indicated by a combination of a time slot and a period. Examples of such a combination are a combination of a certain time slot and weekdays, such as 8:00 to 10:00 of weekdays, and a combination of a certain time slot and a specific day of the week, such as 8:00 to 10:00 on Tuesday.

[Exemplary Embodiment]

Figure 1:
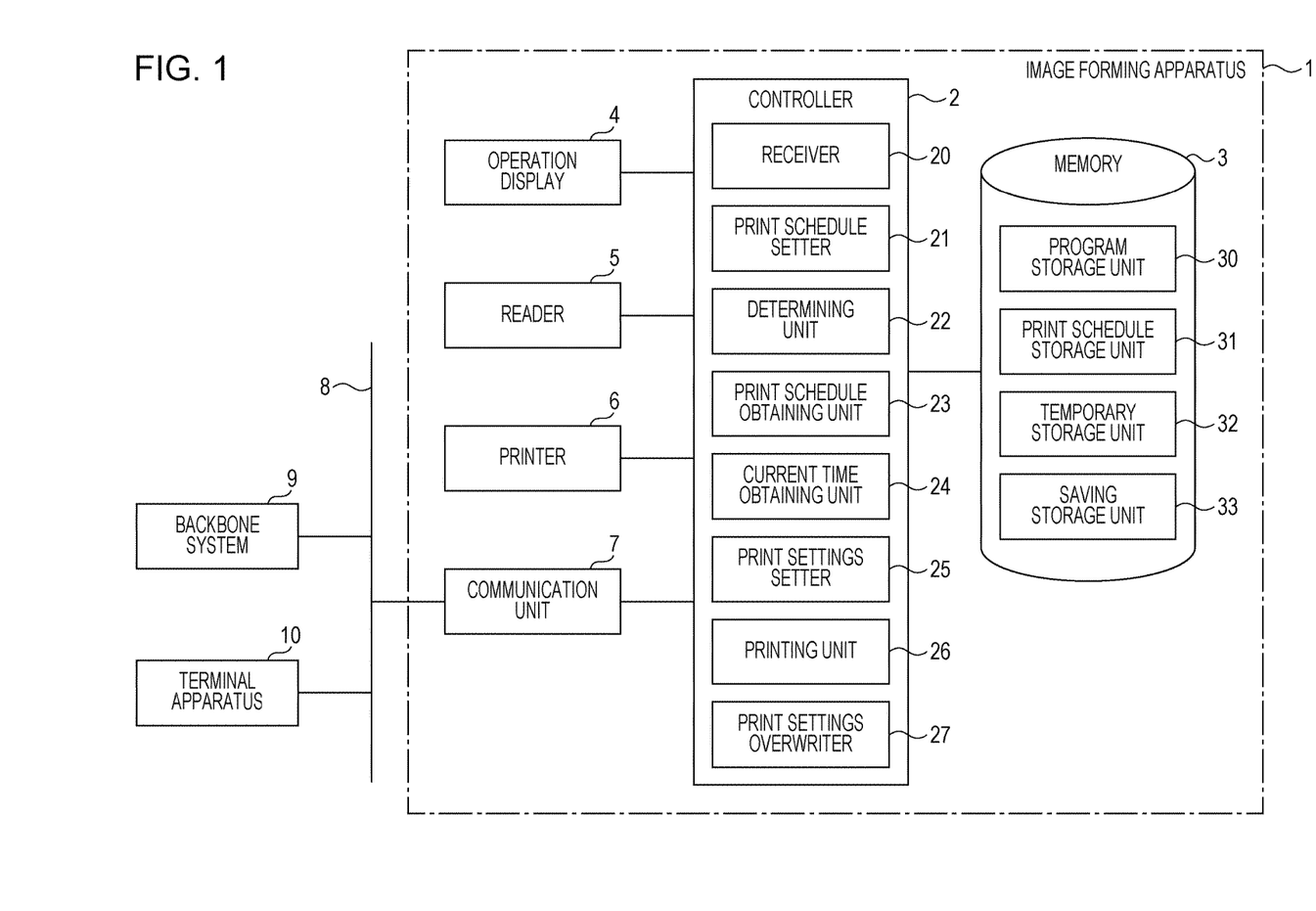
FIG. 1 is a block diagram illustrating an example of the configuration of an image forming apparatus according to the exemplary embodiment.

FIG. 1 is a block diagram illustrating an example of the configuration of an image forming apparatus 1 according to the exemplary embodiment. In this exemplary embodiment, as the regular time information concerning a time at which printing is regularly performed, a combination of a time slot and the day of the week is used as an example.

The image forming apparatus 1 is a multifunction device having multiple functions, such as scan, printer, and copy functions. The image forming apparatus 1 includes a controller 2, a memory 3, an operation display 4, a reader 5, a printer 6, and a communication unit 7. The controller 2 controls the individual elements of the image forming apparatus 1. The memory 3 stores various items of information. The operation display 4 receives user operations and also displays information. The reader 5 reads an image from a document. The printer 6 prints print data on a sheet. The communication unit 7 communicates with external devices. The image forming apparatus 1 is not necessarily a multifunction device and may be any type of device having a printer function. The image forming apparatus 1 is an example of a printing apparatus.

A backbone system 9 and a terminal apparatus 10 are connected to the image forming apparatus 1 via a network 8 as external devices. The image forming apparatus 1 prints print data sent from the backbone system 9 or the terminal apparatus 10 via the network 8 on a sheet.

The network 8 may be a wired medium, such as a local area network (LAN), or a wireless medium, such as the Internet.

The backbone system 9 sequentially sends print data without print settings information to the image forming apparatus 1 via the network 8 in accordance with a print schedule, such as in a certain time slot of a certain day of the week. Usually, the print schedule and print settings information are decided between a sender and a receiver of print data.

The terminal apparatus 10 is a personal computer, for example. The terminal apparatus 10 may alternatively be a portable information processing apparatus, such as a multifunction mobile phone (smartphone). The terminal apparatus 10 has a printer driver and sends print data and print settings information to the image forming apparatus 1 via the network 8 as a print job (print instruction). The print settings information is information concerning print settings set by a user by using the printer driver. The print job is an example of print data with print settings information.

The printer driver converts document data into print data described in a page description language (PDL), such as a portable document format (PDF) or PostScript (registered trademark), that can be interpreted by the printer 6 of the image forming apparatus 1, thereby generating a print job including print data and print settings information. The printer driver then sends the print job to the image forming apparatus 1 via the network 8.

The controller 2 of the image forming apparatus 1 is constituted by a central processing unit (CPU) and an interface, for example. As a result of operating in accordance with a program stored in a program storage unit 30 of the memory 3, the controller 2 functions as a receiver 20, a print schedule setter 21, a determining unit 22, a print schedule obtaining unit 23, a current time obtaining unit 24, a print settings setter 25, a printing unit 26, and a print settings overwriter 27. Details of these functions will be discussed later.

The memory 3 is constituted by a read only memory (ROM), a random access memory (RAM), and a hard disk, for example. The memory 3 includes a program storage unit 30 storing a program, a print schedule storage unit 31, a temporary storage unit 32, and a saving storage unit 33. The print schedule storage unit 31 stores a print schedule table 310 (see FIG. 2) and a print settings table 311 (see FIG. 3). The temporary storage unit 32 temporarily stores print settings information prior to printing. The saving storage unit 33 stores information to be saved. The temporary storage unit 32 is an example of a temporary memory.

The temporary storage unit 32 stores print settings information immediately before printing of print data is started until it is finished.

Figure 2:
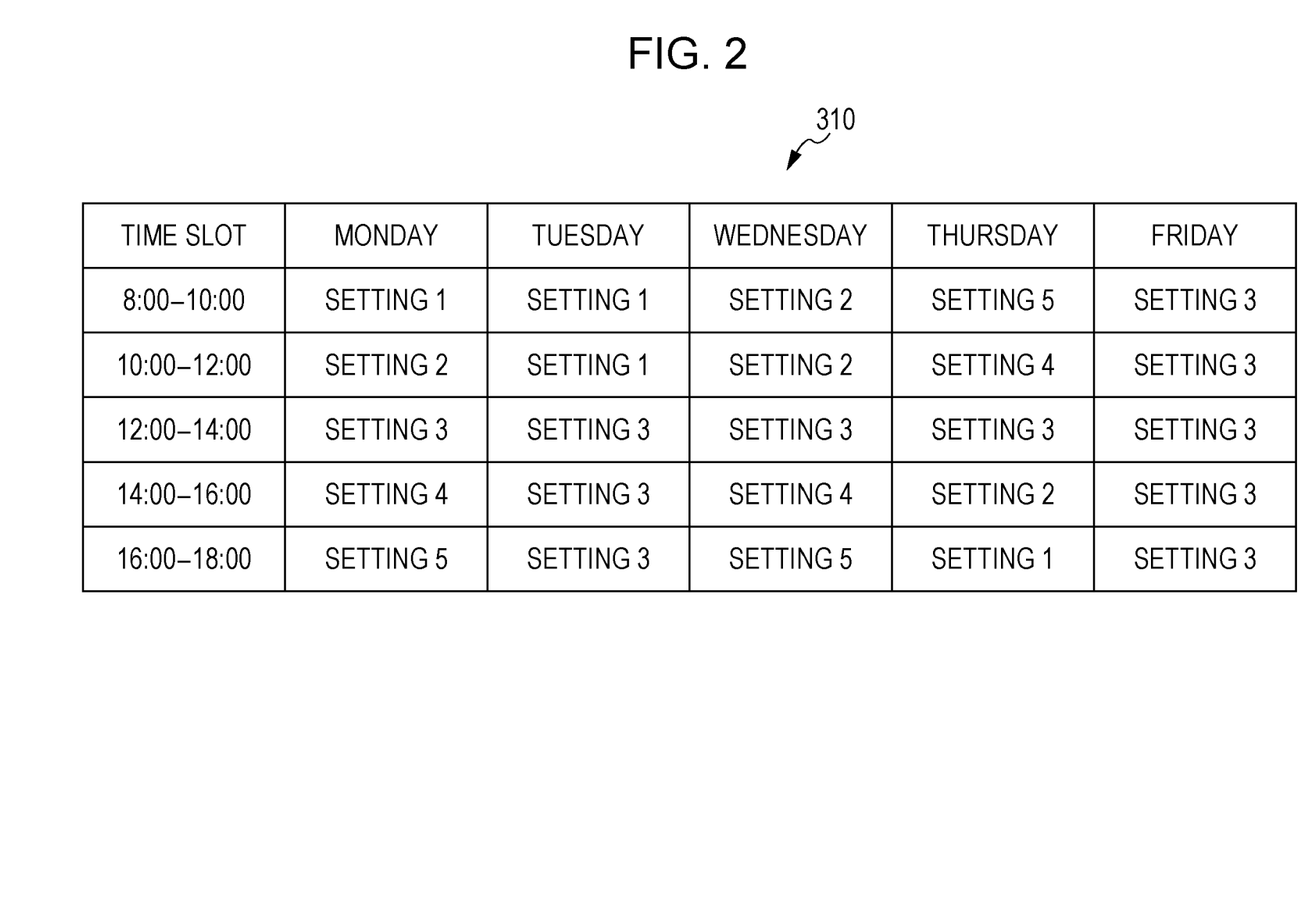
FIG. 2 illustrates an example of a print schedule table.

In the print schedule table 310, a print schedule for printing print data without print settings information is registered. The print schedule table 310 is an example of print schedule information.

Figure 3:
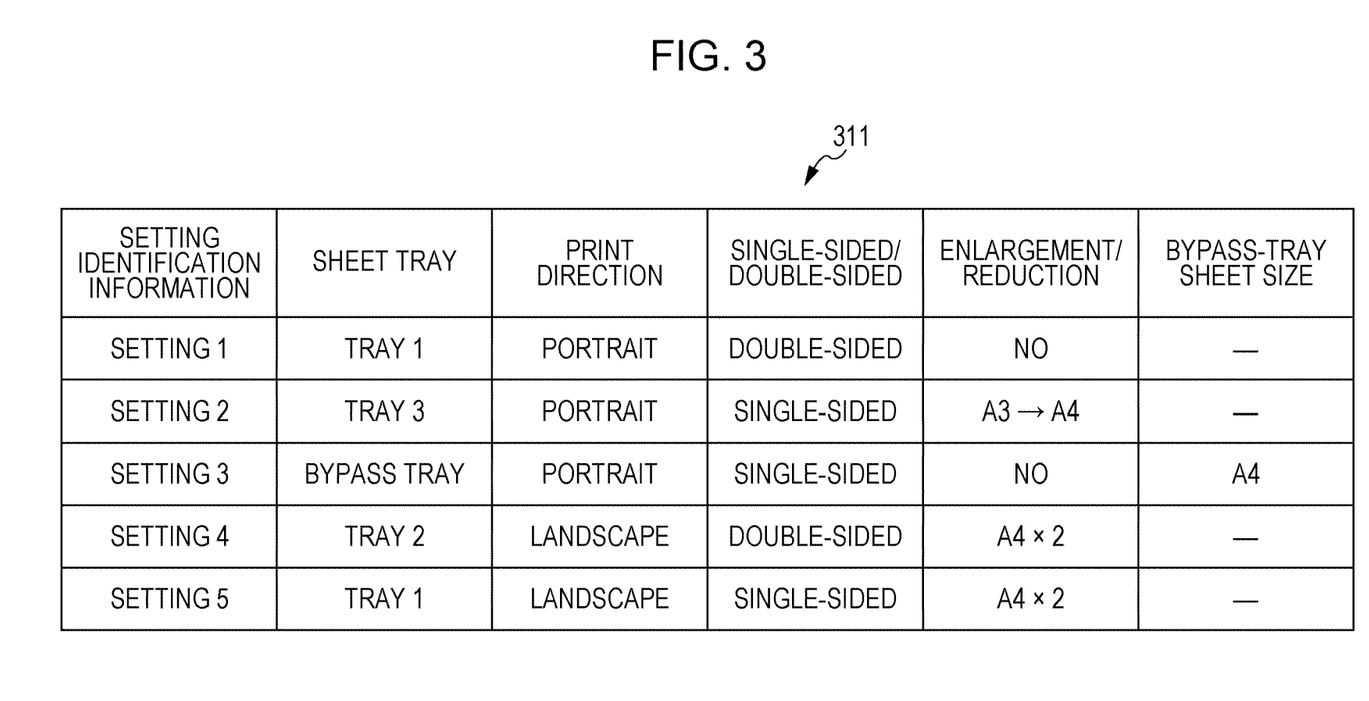
FIG. 3 illustrates an example of a print settings table.

In the print settings table 311, print settings information concerning print data without print settings information is registered in association with the print schedule.

The receiver 20 receives print data sent from the backbone system 9 via the network 8 or a print job sent from the terminal apparatus 10 via the network 8.

The print schedule setter 21 sets a print schedule based on a user operation by registering setting identification information in a corresponding portion of the print schedule table 310. The print schedule setter 21 also sets print settings based on a user operation by registering print settings information in the print settings table 311.

The determining unit 22 determines whether print data received by the receiver 20 is data sent from the backbone system 9 or from the terminal apparatus 10. More specifically, the determining unit 22 determines whether print data received by the receiver 20 is data sent from the backbone system 9 according to whether such print data is data with print settings information.

If the communication protocol between the image forming apparatus 1 and the backbone system 9 is different from that between the image forming apparatus 1 and the terminal apparatus 10, the determining unit 22 may make the above-described determination according to the communication protocol specified by the communication unit 7. Alternatively, the communication unit 7 may determine the file format of data received by the communication unit 7, and the determining unit 22 may make the above-described determination based on the file format.

The print schedule obtaining unit 23 determines whether a print schedule is registered in the print schedule table 310, and if a print schedule is found to be registered, print schedule obtaining unit 23 obtains the print schedule from the print schedule table 310.

The current time obtaining unit 24 obtains the current time and the day of the week from a timer (not shown) connected to the controller 2.

When the receiver 20 receives print data without print settings information, if the time at which the print data is received matches the time indicated in the print schedule, the print settings setter 25 stores, among items of print settings information stored in the memory 3, an item of print settings information corresponding to the current time and the day of the week in the temporary storage unit 32. When the receiver 20 receives a print job, the print settings setter 25 stores print settings information included in the print job in the temporary storage unit 32.

The printing unit 26 prints print data received by the receiver 20 or print data included in a print job received by the receiver 20 in accordance with print settings information stored in the temporary storage unit 32.

When a print job is received by the receiver 20, the print settings overwriter 27 saves print settings information stored in the temporary storage unit 32 in the saving storage unit 33. When the print job has been executed and printed, the print settings overwriter 27 overwrites the storage content of the temporary storage unit 32 by that of the saving storage unit 33 so as to restore the temporary storage unit 32 to the original state.

(Configuration of Print Schedule Table)

FIG. 2 illustrates an example of the print schedule table 310. In the print schedule table 310, items of print settings information are registered in association with the time slot and the weekday of the week.

The print schedule table 310 has a "time slot" field and a "day of the week" field. In the "time slot" field, five time slots 8:00-10:00, 10:00-12:00, 12:00-14:00, 14:00-16:00, and 16:00-18:00 are registered by dividing the operating hours of the image forming apparatus 1. In the "day of the week" field, Monday, Tuesday, Wednesday, Thursday, and Friday are registered. In a "setting identification information" column, setting identification information, that is, one of setting 1, setting 2, setting 3, setting 4, and setting 5, is registered in accordance with a certain time slot and a certain day of the week. The time slots are not limited to the above-described examples.

(Configuration of Print Settings Table)

FIG. 3 illustrates an example of the print settings table 311. In the print settings table 311, a "setting identification information" field, a "sheet tray" field, a "print direction" field, a "single-sided/double-sided" field, an "enlargement/reduction" field, and a "bypass-tray sheet size" field are included.

In the "setting identification information" field, items of setting identification information, that is, setting 1 through setting 5, are registered. In the "sheet tray" field, identification information concerning a sheet tray is registered. In the "print direction" field, the print direction, that is, "portrait" or "landscape", is registered. Portrait is the orientation of an image in which the long sides of a sheet are vertical, while landscape is the orientation of an image in which the short sides of a sheet are vertical. In the "single-sided/double-sided" field, "double-sided" indicating that print data is printed on both sides of a sheet or "single-sided" indicating that print data is printed on a single side of a sheet is registered. In the "enlargement/reduction" field, "A4×2" indicating that two A4-size images are disposed on one sheet, "A3→A4" indicating that A3-size print data is reduced and printed on an A4-size sheet, or "NO" indicating that print data is neither enlarged nor reduced is registered. In the "bypass-tray sheet size" field, the sheet size (A4, for example) when the bypass tray is used is registered.

(Operation of Exemplary Embodiment)

Figure 4:
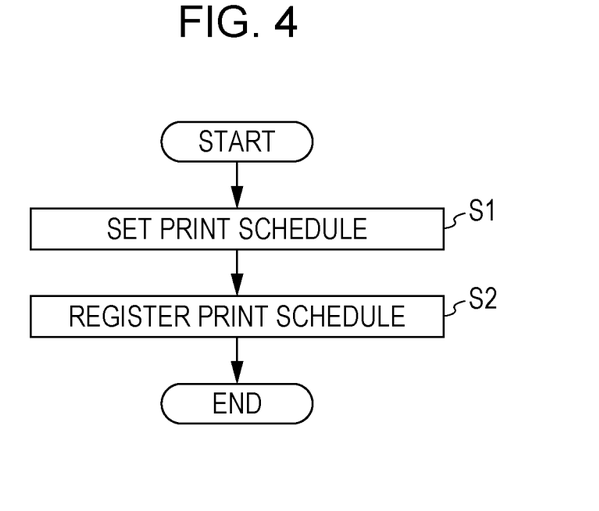
FIG. 4 is a flowchart illustrating an example of the operation of the image forming apparatus.
Figure 5:
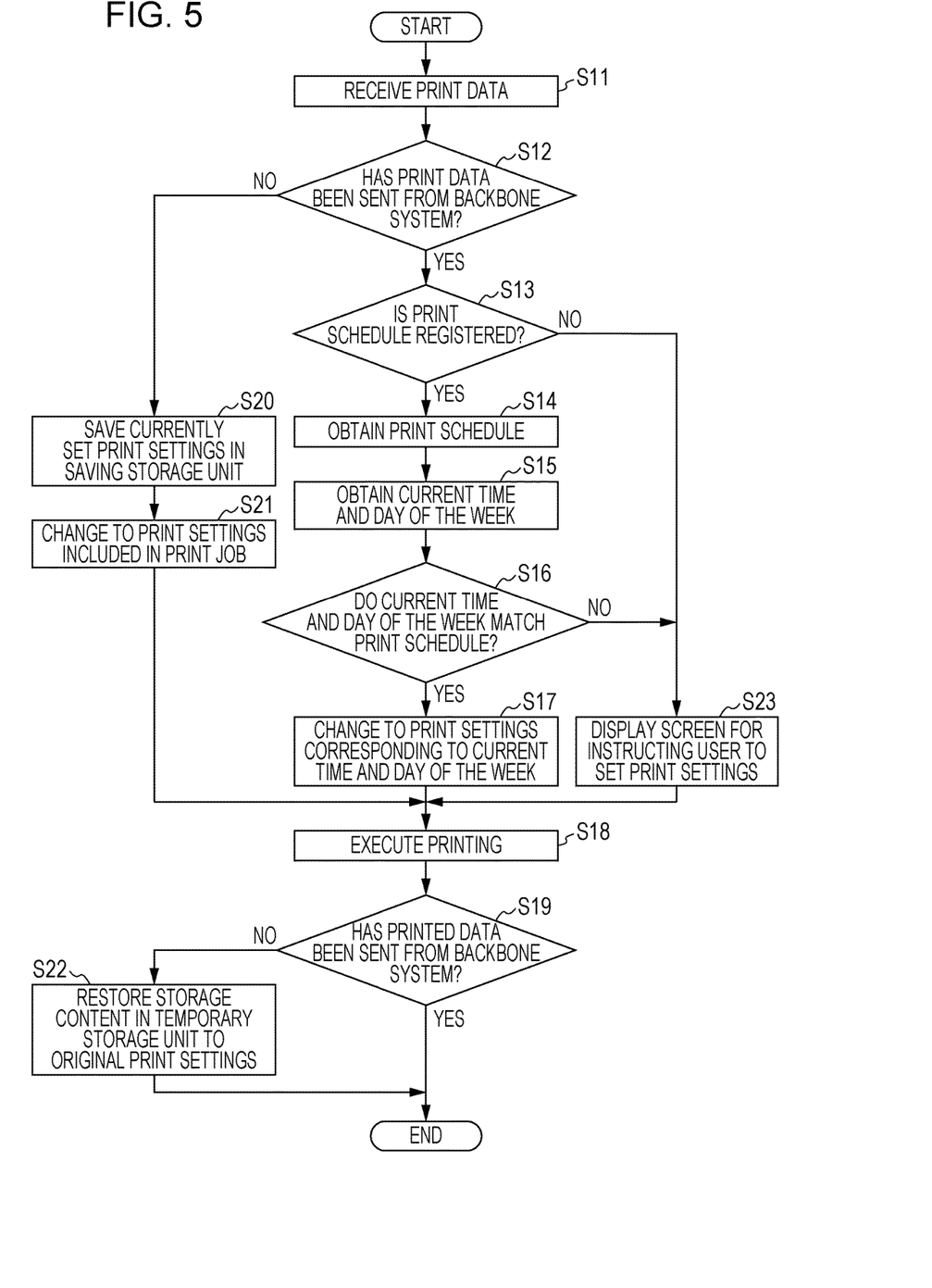
FIG. 5 is a flowchart illustrating an example of the operation of the image forming apparatus.

Examples of the operation of the image forming apparatus 1 will be described below with reference to FIGS. 4 and 5. FIG. 4 is a flowchart illustrating an example of the operation for registering a print schedule in the image forming apparatus 1. FIG. 5 is a flowchart illustrating an example of the operation for printing print data in the image forming apparatus 1.

(1) Registering of Print Schedule

In step S1, a user operates the operation display 4 of the image forming apparatus 1 to select a settings screen on a menu screen, and sets a print schedule and print settings information on the settings screen. More specifically, the user sets a print schedule by selecting one of setting 1 through setting 5 registered in the print settings table 311 in association with the time slot and the day of the week, for example. Concerning the time slot, the user may input certain hours and minutes, such as 10:05-11:10, or a time slot, such as in the morning or in the afternoon within the operating hours. To change print settings information, the user changes the content of settings in the print settings table 311. To add print settings information, the user adds a new setting, such as "setting 6", to the print settings table 311, and registers the content of settings concerning "setting 6".

In step S2, the print schedule setter 21 of the image forming apparatus 1 sets a print schedule by registering the setting identification information selected in association with the time slot and the day of the week in a corresponding portion of the print schedule table 310. If the print settings information is changed or added, the print schedule setter 21 registers and sets the changed or added print settings information in the print settings table 311. A print schedule and print settings information may alternatively be set as follows. An external device, such as the terminal apparatus 10, sends a CSV file to the image forming apparatus 1, and the print schedule setter 21 registers a print schedule in the print schedule table 310 and print settings information in the print settings table 311 based on the CSV file.

(2) Printing of Print Data Sent from Backbone System

In step S11, the image forming apparatus 1 receives print data from the backbone system 9 via the network 8 and the communication unit 7, and the receiver 20 receives the print data. In step S12, the determining unit 22 determines whether the print data received by the receiver 20 is data sent from the backbone system 9. More specifically, the determining unit 22 makes this determination according to whether the print data received by the receiver 20 is with or without print settings information. If the print data is without print settings information, the determining unit 22 determines that the print data is data sent from the backbone system 9. If the print data received by the receiver 20 is a print job including print data and print settings information, the determining unit 22 determines that the print data is data sent from the terminal apparatus 10.

If the determining unit 22 determines that the print data is data sent from the backbone system 9 (YES in step S12), the print schedule obtaining unit 23 determines in step S13 whether a print schedule is registered in the print schedule table 310.

If the print schedule obtaining unit 23 determines that a print schedule is registered (YES in step S13), it obtains the print schedule from the print schedule table 310 in step S14.

In step S15, the current time obtaining unit 24 obtains the current time and the day of the week from the timer.

In step S16, the print settings setter 25 determines whether the current time and the day of the week obtained by the current time obtaining unit 24 match the time and the day of the week of the print schedule registered in the print schedule table 310.

If the print settings setter 25 determines that the obtained current time and the day of the week match the print schedule in the print schedule table 310 (YES in step S16), the process proceeds to step S17. In step S17, the print settings setter 25 changes to print settings indicated by the print settings information corresponding to the obtained current time and day of the week, based on the print schedule table 310. That is, the print settings setter 25 obtains the corresponding print settings information from the print settings table 311 and stores it in the temporary storage unit 32. This eliminates the need to set print settings, which would normally be performed between time slots in a print schedule.

For example, if the current time is 11:00 and the current day of the week is Monday, the print settings setter 25 obtains "setting 2" corresponding to the current time 11:00 and Monday from the print schedule table 310 shown in FIG. 2, and obtains print settings information concerning "setting 2", that is, "tray 3", "portrait", "single-sided", and "A3→A4", from the print settings table 311 shown in FIG. 3, and stores these print settings indicated by print settings information in the temporary storage unit 32.

If the print settings setter 25 determines that the obtained current time and the day of the week do not match the print schedule registered in the print schedule table 310 (NO in step S16), it stops setting print settings. If the print schedule obtaining unit 23 determines in step S13 that a print schedule is not registered or if the print settings setter 25 determines in step S16 that the obtained current time and the day of the week do not match the print schedule registered in the print schedule table 310, it means that print settings have not been set. In step S23, a screen for instructing the user to set print settings is thus displayed. The user then sets print settings, and the printing unit 26 executes printing in step S18.

After the print settings information is registered in the temporary storage unit 32 in step S17, the printing unit 26 prints the print data sent from the backbone system 9 on a sheet in step S18 in accordance with the print settings information stored in the temporary storage unit 32. Steps S11 through S18 are repeated during a certain range of time within the time slot of 10:00 to 12:00 on Monday, for example.

It is then determined in step S19 whether the print data printed in step S18 is data sent from the backbone system 9. In this case, the result of step S19 is YES. The print settings overwriter 27 maintains the print settings information stored in the temporary storage unit 32.

(3) Printing of Print Data Sent from Terminal Apparatus

It is now assumed that, while the image forming apparatus 1 is printing print data sequentially sent from the backbone system 9, it is interrupted by a print job sent from the terminal apparatus 10 via the network 8 and the communication unit 7. Then, in step S11, the image forming apparatus 1 receives this print job, and the receiver 20 receives the print job. In step S12, the determining unit 22 determines whether the print data received by the receiver 20 is data sent from the backbone system 9. The receiver 20 has received a print job including print data and print settings information. The determining unit 22 thus determines that the print data is sent from the terminal apparatus 10 (NO in step S12).

Then, in step S20, the print settings overwriter 27 saves print settings information currently stored in the temporary storage unit 32 in the saving storage unit 33. In step S21, the print settings overwriter 27 then overwrites the storage content of the temporary storage unit 32 by the print settings information included in the print job. When overwriting the print settings information in step S21, a checking screen may be displayed on the operation display 4. Then, the print settings overwriter 27 may overwrite the print settings information only when a user provides an instruction to do so on the checking screen.

In step S18, the printing unit 26 prints the print data on a sheet based on the print settings information stored in the temporary storage unit 32. It is then determined in step S19 whether the print data printed in step S18 is data sent from the backbone system 9. The result of step S19 is NO, and the process proceeds to step S22. In step S22, the print settings overwriter 27 overwrites the storage content of the temporary storage unit 32 by the print settings information saved in the saving storage unit 33.

In this exemplary embodiment, for print data sent from the backbone system 9, the print settings setter 25 changes print settings information stored in the temporary storage unit 32 based on the print schedule table 310. When changing print settings information, a checking screen may be displayed on the operation display 4. Then, the print settings setter 25 may change the print settings information only when a user provides an instruction to do so on the checking screen. With this configuration, even when the sending of print data from the backbone system 9 is delayed, print settings information in a certain time slot is not overwritten by that in a next time slot, and print data that the user has not intended is not printed. This also gives the user to have a time for replacing sheets between time slots.

The controller 2 of the image forming apparatus 1 may predict that a shortage of sheets will occur in the next time slot, based on the print schedule and the print settings information, and instruct the user to load more sheets on the checking screen.

Without the configuration of this exemplary embodiment, every time the image forming apparatus 1 prints print data sent from the backbone system 9, it is required to set print settings information because such print data does not include print settings information. Usually, print data from the backbone system 9 is closely related to a certain timing (schedule), for example, pay statements of all employees are printed at a certain timing near a payday. In other words, print settings information is uniquely specified in relation to a schedule. In this exemplary embodiment, it is possible to set print settings for print data sent from the backbone system 9 in accordance with a print schedule without a user having to perform any operation.

[Modified Examples]

The present invention is not restricted to the above-described exemplary embodiment. Various modifications may be made without departing from the scope of the invention.

The following situation, for example, may be possible. Print settings information is set in advance by the print settings setter 25 of the image forming apparatus 1. Print data from the backbone system 9 is printed based on this print settings information, in particular, when a user does not change this print settings information by operating the operation display 4. In this case, if such print settings information is not suitable for print data from the backbone system 9, the printing results are not what the user has intended, such as in excess of characters per line or fewer lines per sheet. As discussed above, a user is required to set print settings information suitable for print data received from the backbone system 9 in accordance with a print schedule. In this case, print settings information based on a print schedule may be stored in the memory 3 in advance, and print settings information in the print schedule may be specified from the time at which print data is received from the backbone system 9 (the time obtained by the current time obtaining unit 24). Then, the print settings information preset in the image forming apparatus 1 may be replaced by the specified print settings information stored in the storage unit 3. When printing print data included in a print job, the print settings information preset in the image forming apparatus 1 is replaced by that included in the print job.

All or some of the elements of the controller 2, that is, the receiver 20, the print schedule setter 21, the determining unit 22, the print schedule obtaining unit 23, the current time obtaining unit 24, the print settings setter 25, the printing unit 26, and the print settings overwriter 27, may be constituted by a hardware circuit, such as a field programmable gate array (FPGA) or an application specific integrated circuit (ASIC).

Some of the elements of the above-described exemplary embodiment may be omitted or changed without departing from the scope of the invention. In the flowcharts of the above-described exemplary embodiment, steps may be added, deleted, changed, or replaced without departing from the scope of the invention. The program used in the above-described exemplary embodiment may be provided as a result of being recorded in a computer readable recording medium, such as a compact disc-read only memory (CD- ROM). The program may be stored in an external server, such as a cloud server, and be used via a network.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing apparatus comprising:
   a memory that stores print schedule information indicating regular time information concerning a time at which printing is regularly performed and also stores print settings information in association with the print schedule information; and
   a processor configured to:
      receive print data;
      determine whether the received print data is with or without the print settings information;
      print the received print data in accordance with the print settings information if a time at which the print data is received matches the regular time information indicated in the print schedule information; and
      if it is determined that the print data is without the print settings information and if the time at which the print data is received matches the regular time information indicated in the print schedule information, print the received print data in accordance with the print settings information stored in the memory.

2. The printing apparatus according to claim 1, wherein the regular time information is indicated only by a time slot.

3. The printing apparatus according to claim 2, wherein the time slot is a combination of two or more time slots.

4. The printing apparatus according to claim 3, wherein the combination of two or more time slots includes at least a time slot between certain times of day.

5. The printing apparatus according to claim 1, wherein the regular time information is indicated only by a period represented by a day or a longer time unit.

6. The printing apparatus according to claim 5, wherein the period includes any of a day, a day of the week, a week, a month, and a year.

7. The printing apparatus according to claim 1, wherein the regular time information is indicated by a combination of a time slot and a period represented by a day or a longer time unit.

8. The printing apparatus according to claim 7, wherein the time slot is a combination of two or more time slots.

9. The printing apparatus according to claim 8, wherein the combination of two or more time slots includes at least a time slot between certain times of day.

10. The printing apparatus according to claim 7, wherein the period includes any of a day, a day of the week, a week, a month, and a year.

11. The printing apparatus according to claim 1, wherein the received print data is print data without the print settings information.

12. A non-transitory computer readable medium storing a program causing a computer to execute a process, the process comprising:
   receiving print data;
   determining whether the received print data is with or without print settings information associated with print schedule information;
   printing the received print data in accordance with the print settings information stored in a memory of the computer if a time at which the print data is received matches regular time information indicated in the print schedule information, the regular time information indicating a time at which printing is regularly performed; and
   if it is determined that the print data is without the print settings information and if the time at which the print data is received matches the regular time information indicated in the print schedule information, printing the received print data in accordance with the print settings information stored in the memory.

* * * * *